United States Patent Office 3,445,503
Patented May 20, 1969

3,445,503
[4-(2-NITRO-1-ALKENYL)ARYLOXY]ALKANOIC ACIDS
Everett M. Schultz, Ambler, and Edward J. Cragoe, Jr., Lansdale, Pa., assignors to Merck & Co., Inc., Rahway, N.J., a corporation of New Jersey
No Drawing. Filed Nov. 22, 1965, Ser. No. 509,201
Int. Cl. C07c 79/38; C07d 87/34; A61k 27/00
U.S. Cl. 260—471                                    6 Claims

ABSTRACT OF THE DISCLOSURE

[4-(2-nitro-1-alkenyl)phenoxy]alkanoic acid products which are substituted in the benzene nucleus by a single substituent selected from halogen, alkenyl aryloxy, aralkoxy and hydroxyalkyl; and the salt, ester and amide derivatives thereof. The products are diuretic and saluretic agents which are useful in the treatment of conditions associated with electrolyte and fluid retention and hypertension.
The products are obtained via the reaction of a nuclear formyl substituted phenoxyalkanoic acid with a primary amine and then with a nitroalkane and, if desired, hydrolyzing the [4-(2-nitro-1-alkenyl)phenoxy]alkanoate intermediate thus obtained to the desired carboxylic acid product.

---

This invention relates to a new class of chemical compounds which can be described generally as [4-(2-nitro-1-alkenyl)aryloxy]alkanoic acids and to the nontoxic, pharmacologically acceptable salts, esters and amide derivatives thereof.
It is a further object of this invention to describe a novel method of preparation for the foregoing [4-(2-nitro-1-alkenyl)aryloxy]alkanoic acids.
Also, it is an object of this invention to describe novel, therapeutically useful compositions comprising the products of this invention and methods for their administration.
Pharmacological studies show that the instant products are effective diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body and, in general, alleviate conditions usually associated with edema.
The [4-(2-nitro-1-alkenyl)aryloxy]alkanoic acids of the invention are compounds having the following structural formula:

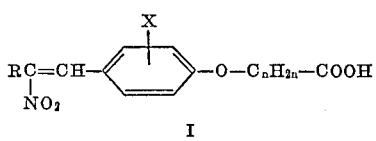

I wherein R is alkyl, for example lower alkyl; X is a member selected from the group consisting of halogen, alkenyl, for example, lower alkenyl, aryloxy, for example, mononuclear aryloxy, aralkoxy, for example, mononuclear aralkoxy and hydroxyalkyl; and $n$ is an integer having a value of one to three.
Those [4-(2-nitro-1-alkenyl)aryloxy]alkanoic acids (I) which contain a halogen atom on the benzene nucleus and which are derivatives of acetic acid exhibit exceptionally good diuretic and saluretic activity and represent a preferred subgroup of compounds within the scope of this invention. These products have the following structural formula:

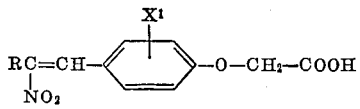

wherein R is lower alkyl such as methyl, ethyl, etc. and $X^1$ is halogen, for example, chlorine, bromine, etc. In comparison with other, related derivatives the said nuclear halo substituted products show a surprising effectiveness in bringing about an increase in the excretion of electrolyte and fluid from the body and may be used to advantage either alone or in combination with other known diuretics and saluretics in the treatment of hypertension, edema and other conditions associated with electrolyte and fluid retention.
The [4-(2-nitro-1-alkenyl)aryloxy]alkanoic acids (I) of the invention are conveniently prepared by the reaction of a formyl substituted phenoxyalkanoic acid or a suitable esterified derivative thereof (II, infra), with a primary amine such as an alkylamine or an arylamine, followed by the reaction of the intermediate thus formed with a nitroalkane. When the formyl susbtituted reagent (II) is an ester of a formyl substituted phenoxyalkanoic acid the product obtained is the corresponding esterified derivative (Ia, infra) which, if desired, may be isolated as such for use in dosage unit forms or, alternatively, may be hydrolyzed in an aqueous acidic medium to yield the corresponding carboxylic acid product (I). The following equation illustrates the reaction, including the hydrolysis step; however, it is to be understood that the hydrolysis step is an optional one which is employed only when $R^2$ in the planar Formulae Ia and II, infra, represents a hydrocarbyl radical, and it is desired to obtain the [4-(2-nitro-1-alkenyl)aryloxy]alkanoic acid product (I):

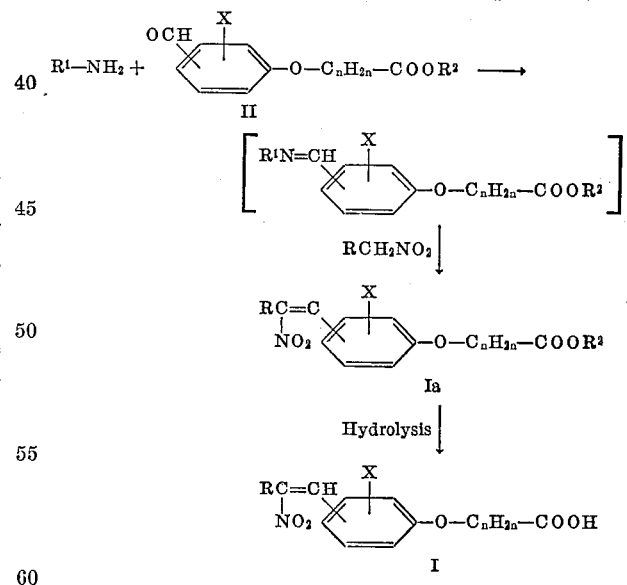

wherein R, X and $n$ are as defined above; $R^1$ is a member selected from the group consisting of alkyl, aryl, for example, mononuclear aryl such as phenyl, p-tolyl, naphthyl, etc. and $R^2$ is a member selected from the group consisting of hydrogen, a hydrocarbyl radical, i.e., an organic radical composed solely of carbon and hydrogen such as alkyl, and a dialkylamino substituted alkyl radical such as 2-diethylaminoethyl, etc.
Preferably, the condensation of the formyl substituted phenoxyalkanoic acid, or a corresponding esterified derivative thereof (II), with the primary amine reagent is conducted in the presence of a water-immiscible solvent system to allow for removal of the water formed during the reaction as, for example, by azeotropic distillation or, alternatively, by the use of chemical dehydrating agents or molecular sieves. In general, any water-immiscible solvent in which the reactants and products are reasonably soluble may be employed but benzene has proved to be a particularly advantageous reaction medium for this purpose.

When the reactant employed is a formyl substituted phenoxyalkanoic acid it is necessary to use at least two molar equivalents of the primary amine per mole of acid. Also, it is most advantageous to add a molar excess of a substantially anhydrous lower alkanoic acid, such as glacial acetic acid, to the reaction mixture containing the nitroalkane reactant. The reaction mixture may then be heated to boiling for a short period, cooled and then poured over ice water to precipitate the desired [4-(2-nitro-1-alkenyl)-aryloxy]alkanoic acid or the corresponding esterified derivative thereof.

The hydrolysis step is advantageously conducted in an aqueous solution of a lower alkanoic acid, for example, in an aqueous solution of acetic acid, etc., which contains a catalytic amount of an acid such as hydrochloric acid, etc. The hydrolysis may be conducted at ambient temperatures but, generally, it is most advantageous to carry out the hydrolysis at elevated temperatures such as at 50° C. to the reflux temperature of the reaction mixture.

The formyl substituted phenoxyalkanoic acids and their corresponding esters (II), which are employed as starting materials in the aforementioned reaction with the primary amine and nitroalkane reactant may be prepared by several alternate routes. However, inasmuch as the methods for the preparation of the ester derivatives (IIc, infra) differ somewhat from the methods for the preparation of the corresponding acids (IIa, infra), the various synthetic routes for their preparation will be presented separately.

The formyl substituted phenoxyalkanoic acid starting materials (IIa) are conveniently prepared from their corresponding nuclear hydroxy substituted benzaldehyde precursors (III, infra) by the reaction of the latter with an appropriate etherification reagent.

When, for example, it is desired to prepare a formyl substituted phenoxyalkanoic acid (IIa, infra) wherein the alkylene chain in the alkanoic acid moiety has one or three linear carbon atoms in the chain between the carboxy and oxygen radicals, the etherification reagent is an haloalkanoic acid having the formula: $X^1$—$Y^1$—$COOR^4$ wherein $X^1$ is halogen, for example, chlorine, bromine, iodine, etc.; $Y^1$ is a methylene or trimethylene radical, etc., and $R^4$ is hydrogen or the cation derived from an alkali metal hydroxide, an alkali metal carbonate, etc., such as a sodium or potassium cation. In general, the etherification reaction is conducted in the presence of a base such as in an aqueous solution of sodium or potassium carbonate or in the presence of a sodium hydroxide, or in the presence of a sodium alcoholate in alcohol such as sodium ethoxide in ethanol and the alkanoic acid salt thus obtained is then converted to the desired formyl substituted phenoxyalkanoic acid derivative (IIa) in the conventional manner by treatment with an acid such as hydrochloric acid. The following equation illustrates the reaction:

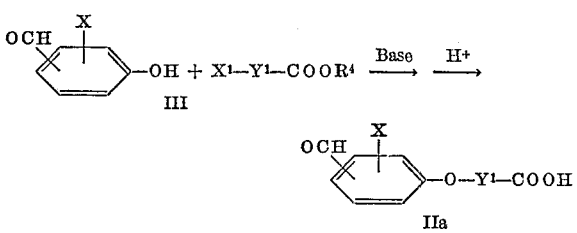

wherein $R^4$, X, $X^1$ and $Y^1$ are as defined above and $H^+$ is the cation derived from an organic or inorganic acid such as hydrochloric acid, etc. The reaction may be carried out at ambient temperature but, generally, it is most desirable to conduct the reaction at temperatures slightly above ambient temperature.

Those formyl substituted phenoxyalkanoic acid starting materials (IIb, infra) wherein the alkylene chain contains two linear carbon atoms between the carboxy and oxygen moieties are prepared from their corresponding nuclear hydroxy substituted benzaldehyde precurors (III) by the reaction of the latter with propiolactone or with an appropriately substituted propiolactone in the presence of a base such as an aqueous solution of sodium hydroxide, preferably, while heating the solution at reflux temperatures; followed by the acidification of the carboxylate intermediate (IIIa, infra) thus formed to obtain the corresponding formyl substituted phenoxyalkanoic acid (IIb). The following equation illustrates the reaction:

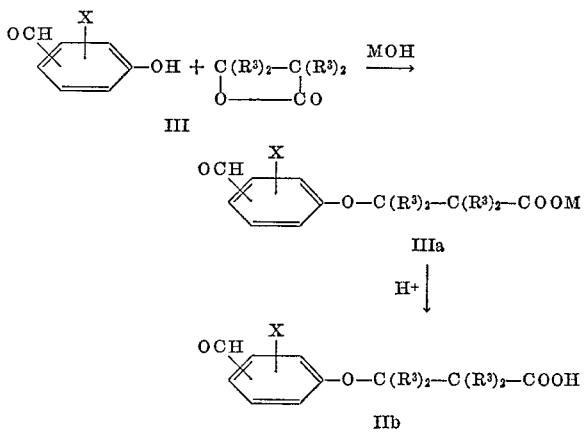

wherein X and $H^+$ are as defined above and $R^3$ is a member selected from the group consisting of hydrogen and lower alkyl, for example methyl, and M is the cation derived from an alkali metal hydroxide such as sodium hydroxide.

The formyl substituted phenoxyalkanoic acids (IIa) can also be prepared by the hydrolysis, in an aqueous solution of an acid or a base, of the corresponding formyl substituted phenoxyalkanoic acid ester (IIc, infra) as shown by the following equation:

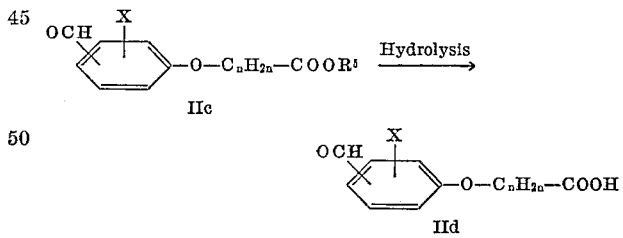

wherein X and $n$ are as defined above and $R^5$ is a hydrocarbyl radical, for example, alkyl, etc.

The formyl substituted phenoxyalkanoic acid esters (IIc), which may also be employed as starting materials in the preparation of the [4-(2-nitro-1-alkenyl)aryloxy] alkanoic acid products (I) of the invention are also prepared by either of three alternate routes: (a) by the etherification of an appropriate nuclear hydroxy substituted benzaldehyde (III); (b) by the esterification of a formyl substituted phenoxyalkanoic acid (IIb); or (c) by the formylation of a phenoxyalkanoic acid ester (V, infra).

The etherification process (a) for the preparation of the formyl substituted phenoxyalkanoic acid esters is conducted in a manner similar to that described above for the preparation of the corresponding formyl substituted phenoxyalkanoic acids (IIa). A haloalkanoic acid ester in which the alkylene chain joining the halogen and carboxy groups is a methylene, trimethylene moiety, etc., is treated with a nuclear hydroxy substituted benzaldehyde (III) in the presence of a base such as sodium or potassium carbonate or sodium or potassium hydroxide or in the presence of a sodium alcoholate such as sodium ethoxide and, preferably, at temperatures above ambient temperature. The choice of a suitable reaction solvent is dependent largely upon the character of the reactants employed but, in general, any solvent which is substantially inert to the reactants and in which the reagents are reasonably soluble may be used. Ethanol, acetone and dimethylformamide have proved to be particularly advantageous solvents in which to conduct the synthesis. The following equation illustrates the reaction:

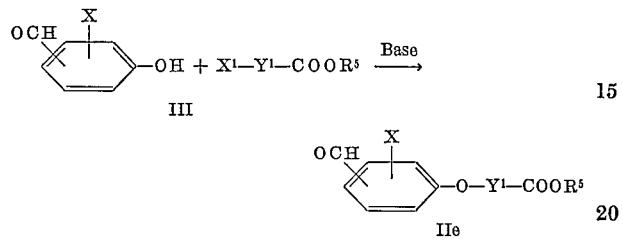

wherein $R^5$, X, $X^1$ and $Y^1$ are as defined above. Any suitable reaction solvent may be employed but ethanol or dimethylformamide have proved to be particularly advantageous reaction mediums. The reaction may be conducted at ambient temperatures but, generally, it is desirable to conduct the reaction at temperatures above ambient temperature. Also, it will be appreciated that in view of the limitation on the length of the alkylene chain (i.e., the linkage $Y^1$) in the haloalkanoic acid ester reactant, the foregoing etherification reaction is limited to the preparation of formyl substituted aryloxyacetic acid esters, formyl substituted aryloxy butyric acid esters and the branched chain homologous derivatives thereof such as the 2-(formyl substituted phenoxy)propionic acid esters, etc.

The esterification process (b) for the preparation of the formyl substituted phenoxyalkanoic acid esters (IIc) is effected by the reaction of an appropriate formyl substituted phenoxyalkanoic acid (IId) with an appropriate lower alkanol, etc. in an acidic medium to obtain the corresponding esterified product; or, alternatively, by the reaction of a formyl substituted phenoxyalkanoic acid (IId) with a suitable halogenating agent to form the corresponding acid halide and then treating the said formyl substituted phenoxyalkanoic acid halide (IV) thus formed with the lower alkanol, etc. to prepare the corresponding esterified product (IIc). The following equation illustrates these methods of preparation:

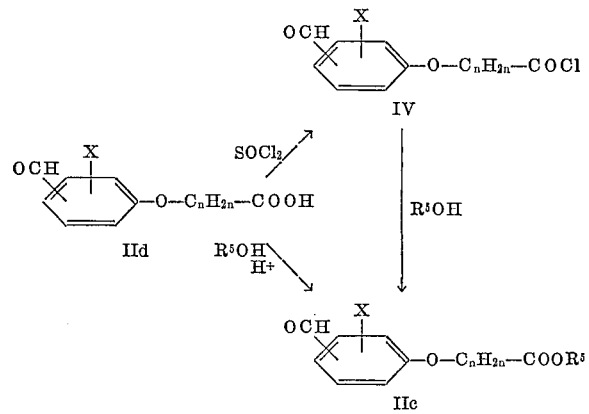

wherein $R^5$, X and $n$ are as defined above and $H^+$ is the cation derived from an organic or inorganic acid, for example, hydrochloric acid, etc.

The formylation process (c) for preparing the formyl substituted phenoxyalkanoic acid starting materials (IIc) is conducted by treating an appropriate phenoxyalkanoic acid ester (V, infra) with formaldehyde and concentrated hydrochloric acid to obtain the corresponding chloromethyl substituted phenoxyalkanoic acid ester (VI) and the chloromethyl derivative thus obtained is then treated with hexamethylenetetramine and concentrated hydrochloric acid under reflux to obtain the desired formyl substituted compound (IIc). The following equation illustrates the process:

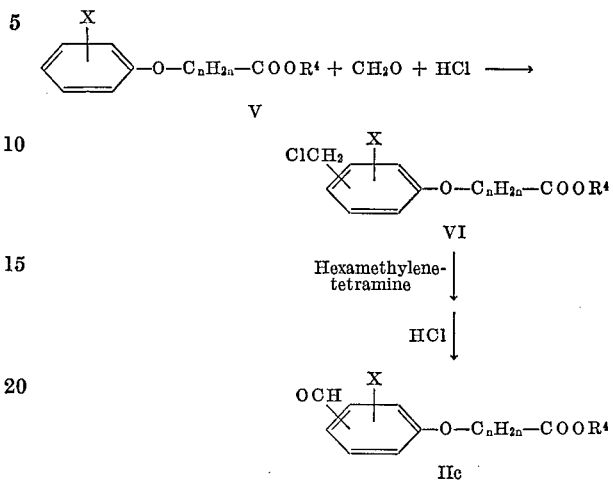

wherein $R^4$, X and $n$ are as defined above.

The nuclear hydroxy substituted benzaldehyde intermediates (III) are either known compounds or may be prepared by methods which are known to those skilled in the art. Thus, for example, by treating a phenol or appropriate nuclear substituted derivative thereof with chloroform in the presence of an aqueous solution of a base and then treating the resulting mixture with an acid such as hydrochloric acid, the corresponding nuclear hydroxy substituted benzaldehyde is obtained. Alternatively, the said hydroxy substituted benzaldehyde intermediates (III) may also be obtained by the reaction of a phenol, or appropriate nuclear substituted derivative thereof, with hydrogen cyanide or zinc cyanide and hydrogen chloride (gas) in the presence of anhydrous aluminum chloride. This reaction is preferably conducted in an inert solvent as, for example, in a benzene solution. The following equations illustrate these methods of preparation:

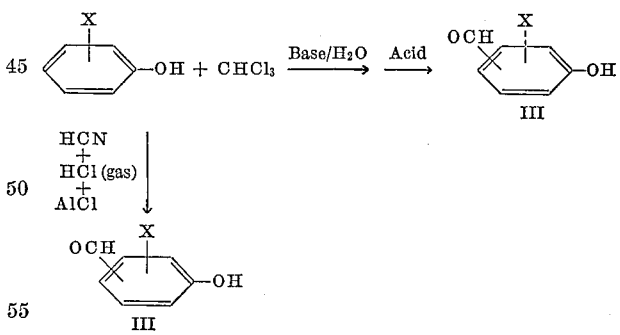

wherein X is as defined above.

The [4-(2-nitro-1-alkenyl)aryloxy]alkanoic acids, esters and amides isolated according to this invention are generally obtained as crystalline solids and, if desired, may be purified by recrystallization from a suitable solvent. Suitable solvents include, for example, methanol, ethanol, cyclohexane, etc. or mixtures of solvents such as a mixture of acetic acid and water or a mixture of ethanol and water or a mixture of ethanol and benzene, etc.

Included within the scope of this invention are the nontoxic, pharmacologically acceptable acid addition salts of the instant products (I). In general, any base which will form an acid addition salt with a [4-(2-nitro-1-alkenyl) aryloxy]alkanoic acid (I) and whose pharmacological properties will not cause an adverse physiological effect when ingested by the body system is considered as being within the scope of this invention; suitable bases include, for example, the alkali metal and alkaline earth metal hydroxides, carbonates, etc., ammonia, primary, secondary and tertiary amines such as monoalkylamines, dialkylamines, trialkylamines, nitrogen containing heterocyclic amines, for example, piperidine, etc.

Also included within the scope of this invention are the ester and amide derivatives of the instant [4-(2-nitro-1-alkenyl)aryloxy]alkanoic acids (I), which may be prepared by several methods. According to one such method, the ester derivatives are prepared by the reaction of a [4-(2-nitro-1-alkenyl)aryloxy]alkanoic acid (I) with an alcohol as, for example, with a lower alkanol, a di-lower alkylamino alkanol such as dimethylaminomethanol, etc. or, alternatively, the [4-(2-nitro-1-alkenyl)aryloxy]alkanoic acid (I) may be converted to its acid halide by conventional methods and the acid halide thus formed may be reacted with a lower alkanol, di-lower alkylaminoalkanol, etc. to obtain the corresponding ester derivative. Also, as indicated hereinabove, the ester derivatives of this invention may be prepared inherently by employing in the method disclosed for the preparation of the instant products, the appropriate ester of the formyl substituted phenoxyalkanoic acid reactant (II, supra) to obtain the corresponding [4-(2-nitro-1-alkenyl)aryloxy] alkanoic acid ester derivative. The amide derivatives of the instant products (I) are prepared by treating the acid halide of the instant [4-(2-nitro-1-alkenyl)aryloxy]alkanoic acids (I) with ammonia or with an appropriate monoalkylamine, dialkylamine, dialkylaminoalkylamine or with a heterocyclic amine such as pyrrolidine, piperidine, morpholine, etc. to produce the corresponding amide. Still another method for preparing the said amide derivatives consists in treating an ester of a [4-(2-nitro-1-alkenyl) aryloxy]alkanoic acid (I), prepared as described above, with ammonia or with an appropriate monoalkylamine, dialkylamine, dialkylaminoalkylamine or with a heterocyclic amine such as pyrrolidine, piperidine, morpholine, etc. to produce the corresponding amide derivative. These and other equivalent methods for the preparation of the ester and amide derivatives of the instant products (I) will be apparent to those having ordinary skill in the art and to the extent that the said derivatives are both non-toxic and physiologically acceptable to the body system the said esters and amides are the functional equivalent of the corresponding [4-(2-nitro-1-alkenyl)aryloxy]alkanoic acids (I).

The examples which follow illustrate the [4-(2-nitro-1-alkenyl)aryloxy]alkanoic acids (I) of the invention and the method by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

Example 1.—[3-chloro-4-(2-nitro-1-propenyl) phenoxy]acetic acid

Step A.—Ethyl (3-chloro-4-formylphenoxy)acetate.— 2-chloro-4-hydroxybenzaldehyde (7.8 g., 0.05 mole) is dissolved in dry acetone (100 ml.) and anhydrous potassium carbonate (6.9 g., 0.05 mole) is added. The mixture is heated to boiling under anhydrous conditions and ethyl bromoacetate (8.35 g., 0.05 mole) is added portion-wise with stirring. Heating and stirring are then continued for 5½ hours. Water (100 ml.) is added after which most of the acetone (80 ml.) is evaporated and an oil separates. The oil gradually solidifies and the solid is collected by filtration and dried in air. The ethyl (3-chloro-4-formylphenoxy)acetate (11.2 g., 92%) thus obtained melts at 55–59° C.

Step B.—Ethyl [3-chloro-4-(2-nitro-1-propenyl)phenoxy]acetate.—Ethyl (3-chloro-4-formylphenoxy)acetate (11.2 g., 0.046 mole) and n-butylamine (3.35 g., 0.046 mole) are dissolved in dry benzene (60 ml.) and the mixture heated under a constant water separator until no more water separates. The benzene then is evaporated at reduced pressure and nitroethane (12.5 g., 0.165 mole) and glacial acetic acid (35 ml.) are added to the residual aldimine. The mixture is heated to boiling, cooled slightly and added with stirring to crushed ice. When the ice has melted, the yellow solid that forms is collected by filtration, dried by suction and crystallized from ethanol to obtain 10.4 g. of ethyl [3-chloro-4-(2-nitro-1-propenyl) phenoxy]acetate, melting point 94–96° C.

Analysis for $C_{13}H_{14}ClNO_5$.—Calculated: C, 52.10; H, 4.71; N, 4.67. Found: C, 52.25; H, 4.52; N, 4.62.

Step C.—[3-chloro-4-(2-nitro-1-propenyl)phenoxy] acetic acid.—Ethyl [3-chloro-4-(2-nitro-1-propenyl) phenoxy]acetate (8.3 g., 0.0278 mole) is added to acetic acid (48 ml.) whereupon the solid partly dissolves. Water (35 ml.) and 12 N hydrochloric acid (1.3 ml.) then are added and a heavy precipitate forms. Upon heating to boiling the mixture darkens. Boiling is continued for 1¼ hours. The mixture then is added to water (200 ml.) and the solid that separates is collected and dried by suction. The product is crystallized from water and then from benzene to obtain 3.6 g. of [3-chloro-4-(2-nitro-1-propenyl)phenoxy]acetic acid in the form of yellow needles, melting at 145–146.5° C.

Analysis for $C_{11}H_{10}ClNO_5$.—Calculated: C, 48.62; H, 3.71; N, 5.16. Found: C, 48.73; H, 3.77; N, 5.09.

Example 2.—[3-chloro-4-(2-nitro-1-butenyl)phenoxy] acetic acid

Step A.—Ethyl [3-chloro-4-(2-nitro-1-butenyl) phenoxy]-acetate.—Ethyl (3-chloro-4-formylphenoxy) acetate (11.2 g., 0.046 mole) and n-butylamine (3.35 g., 0.046 mole) are dissolved in dry benzene (16 ml.) and the mixture heated under a constant water separator until no more water separates. The benzene then is evaporated at reduced pressure and 1-nitro-propane (14.7 g., 0.165 mole) in glacial acetic acid (35 ml.) is added to the residual aldimine. The mixture is heated to boiling, cooled slightly and added with stirring to crushed ice. When the ice is melted the yellow solid that remains is collected by filtration, dried by suction and crystallized from ethanol to yield ethyl [3-chloro-4-(2-nitro-1-butenyl)phenoxy] acetate, M.P. 65–66° C.

Step B.—13-chloro-4-(2-nitro-1-butenyl)phenoxy]acetic acid.—By substituting ethyl [3-chloro-4-(2-nitro-1-butenyl)phenoxy]acetate, obtained as described in Step A, for the ethyl [3-chloro-4-(2-nitro-1-propenyl)phenoxy] acetate of Example 1, Step C, and following substantially the procedure described therein there is thus obtained [3-chloro-4-(2-nitro-1-butenyl)phenoxy]acetic acid, M.P. 109–110° C.

Analysis for $C_{12}H_{12}ClNO_5$.—Calculated: C, 50.45; H, 4.24; N, 4.90. Found: C, 50.18; H, 4.23; N, 5.04.

Example 3.—[2-chloro-4-(2-nitro-1-butenyl)phenoxyl] acetic acid

Step A.—Ethyl (2-chloro-4-formylphenoxy)acetate. A mixture of 3-chloro-4-hydroxybenzaldehyde (25 g.), ethyl bromoacetate (40.0 g.), potassium carbonate (40 g.) and dimethylformamide is heated at 50–55° C. for one hour. Upon addition of water, an oil separates. The oil is extracted with ether, the ether extract is washed with water and dried over magnesium sulfate. The ether is evaporated and the residue is distilled, B.P. 160° C. (1.5 mm.). The sample solidifies on standing. The product thus obtained is ethyl (2-chloro-4-formylphenoxy)acetate, M.P. 46–48° C., which is used in the next step without further purification.

Analysis for $C_{11}H_{11}ClO_4$.—Calculated: C, 54.45; N, 4.57; Cl, 14.61. Found: C, 54.84; N, 4.67; Cl. 14.21.

Step B.—[2-chloro-4-(2-nitro-1-butenyl)phenoxy]acetic acid.—The ethyl (2-chloro-4-formylphenoxy)acetate (4.6 g.) obtained in Step A, benezene (50 ml.) and n-butylamine (1.5 g.) is refluxed until no more water is evolved. The benzene is evaporated and to the residue is added 1-nitropropane (6.9 g.) and acetic acid (15 ml.).

The mixture thus obtained is heated to boiling, cooled and the acetic acid and excess 1-nitropropane are evaporated under reduced pressure. The residue thus obtained is crystallized from n-butylchloride to yield 1.8 g. of ethyl [2-chloro-4-(2-nitro-1-butenyl)phenoxyl]acetate, M.P. 83–84.5° C. The ester is added to acetic acid (40 ml.), water (20 ml.) and concentrated hydrochloric acid (1.5 ml.) and the mixture is refluxed for 3½ hours to effect hydrolysis. There is thus obtained 0.7 g. of [2-chloro-4-(2-nitro-1-butenyl)phenoxyl]acetic acid, M.P. 145–146° C., from a mixture of acetic acid and water.

Analysis for $C_{12}H_{12}ClNO_5$.—Calculated: C, 50.45; H, 4.24; N, 4.90. Found: C, 50.27; H, 4.27; N, 4.90.

In a manner similar to that described in Example 1 for the preparation of [3-chloro-4-(2-nitro-1-propenyl)phenoxyl]acetic acid, all of the [4-(2-nitro-1-alkenyl)aryloxy] alkanoic acid products (I) of the invention may be obtained. Thus, by substituting the appropriate nuclear hydroxy substituted benzaldehyde, alkyl haloalkanoate, primary amine and nitroalkane, respectively, for the 2-chloro-4-hydroxybenzaldehyde, ethyl bromoacetate, n-butylamine and nitroethane recited in Example 1, Steps A and B, and following substantially the procedure described in Steps A, B and C of that example, all of the [(2-nitro-1-alkenyl)aryloxy]alkanoic acid products (I) of the invention may be obtained. The following equations illustrate the reaction of Example 1. Steps A, B and C, and together with Table I, depict the nuclear hydroxy substituted benzaldehyde, alkyl haloalkanoate, primary amine and nitroalkane starting materials of the process and the corresponding products produced thereby:

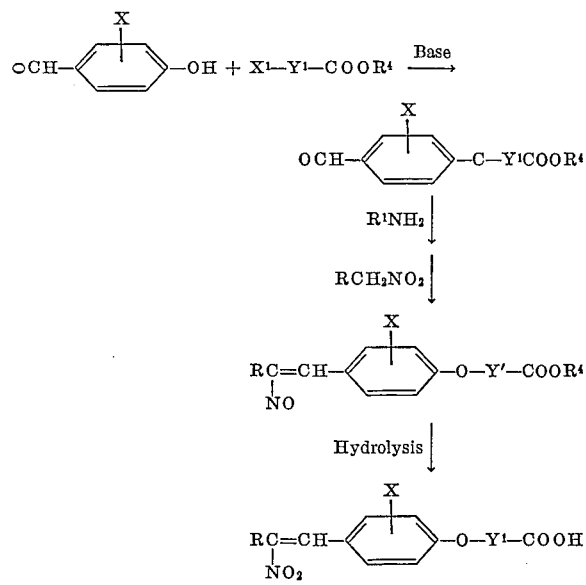

The products of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be administered by mixing 20 mg. of a [4-(2-nitro-1-alkenyl)aryloxy]alkanoic acid (I) or a suitable acid addition salt, ester or amide derivative thereof, with 174 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the products of this invention in a unit dosage form or to combine one or more of the compounds with other known diuretics and saluretics or with other desired therapeutic and/or nutritive agents in dosage unit form.

The following examples are included to illustrate the preparation of representative dosage forms:

Example 15.—Dry-filled capsules containing 20 mg. of active ingredient per capsule Per capsule, mg.

[3-chloro-4-(2-nitro - 1 - propenyl)phenoxy]acetic acid _____ 20
Lactose _____ 174
Magnesium stearate _____ 6

Capsule size No. 3 _____ 200

The [3 - chloro-4-(2-nitro-1-propenyl)phenoxy]acetic acid is reduced to a No. 60 powder and lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of one or more of the other novel compounds of

TABLE I

| Example No. | R | $R^1$ | $R^4$ | X | $Y^1$ |
|---|---|---|---|---|---|
| 4 | —(CH$_2$)$_4$CH$_3$ | —(CH$_2$)$_3$CH$_3$ | —CH$_3$ | 3-Br | —CH$_2$— |
| 5 | —CH$_3$ | —(CH$_2$)$_4$CH$_3$ | —CH$_3$ | 3-Cl | —(CH$_2$)$_3$— |
| 6 | —C$_2$H$_5$ | —C$_2$H$_5$ | —CH$_3$ | 3-F | —CH$_2$— |
| 7 | —(CH$_2$)$_2$CH$_3$ | —(CH$_2$)$_3$CH$_3$ | —C$_2$H$_5$ | 2-Cl | —CH$_2$— |
| 8 | —CH$_3$ | —(CH$_2$)$_2$CH$_3$ | —C$_2$H$_5$ | 3—CH$_2$CH$_2$OH | —CH$_2$— |
| 9 | —C$_2$H$_5$ | —(CH$_2$)$_3$CH$_3$ | —CH$_3$ | 2-I | —(CH$_2$)$_3$— |
| 10 | —C$_2$H$_5$ | —(CH$_2$)$_4$CH$_3$ | —C$_2$H$_5$ | 2-O—⟨⟩ | —CH$_2$— |
| 11 | —C$_2$H$_5$ | —C$_2$H$_5$ | —(CH$_2$)$_3$CH$_3$ | 2-CH$_2$—CH=CH$_2$ | —(CH$_2$)$_3$— |
| 12 | —CH$_3$ | —(CH$_2$)$_3$CH$_3$ | —CH$_3$ | 2-OCH$_2$—⟨⟩ | —(CH$_2$)$_3$— |
| 13 | —(CH$_2$)$_5$CH$_3$ | —(CH$_2$)$_2$CH$_3$ | —(CH$_2$)$_2$CH$_3$ | 2-F | —CH$_2$— |
| 14 | —(CH$_2$)$_2$CH$_3$ | —(CH$_2$)$_4$CH$_3$ | —C$_2$H$_5$ | 2-Br | —CHCH$_3$— | this invention and varying the amounts of the ingredients to obtain the desired dosage.

Example 16.—Dry-filled capsule containing 50 mg. of active ingredient per capsule By following the procedure described in Example 15 but substituting [3-chloro-4-(2-nitro-1-butenyl)phenoxy]acetic acid for the [3-chloro-4-(2-nitro-1-propenyl)phenoxy]acetic acid recited therein and using the following proportions of ingredients, a capsule containing 200 mg. of product is obtained:

| | Per capsule, mg. |
|---|---|
| [3-chloro-4-(2-nitro-1-butenyl)phenoxy]acetic acid | 50 |
| Lactose | 144 |
| Magnesium stearate | 6 |
| Capsule size No. 3 | 200 |

Example 17.—Dry-filled capsule containing 5 mg. of active ingredient per capsule By following the procedure described in Example 15, but substituting [2-chloro-4-(2-nitro-1-butenyl)phenoxy]acetic acid for the [3-chloro-4-(2-nitro-1-propenyl)phenoxy]acetic acid recited therein and using the following proportions of ingredients, a dry-filled capsule containing 200 mg. of product is obtained:

| | Per capsule, mg. |
|---|---|
| [2-chloro-4-(2-nitro-1-butenyl)phenoxy]acetic acid | 5 |
| Lactose | 189 |
| Magnesium stearate | 6 |
| Capsule size No. 3 | 200 |

The following example illustrates a method by which a compressed tablet can be made containing a product of this invention as the active ingredient.

Example 18.—Compressed tablet containing 50 mg. of active ingredient per tablet

The following ingredients are employed:

| | [Per tablet, mg.] |
|---|---|
| [3-chloro-4-(2-nitro-1-propenyl)-phenoxyacetic acid | 50 |
| Lactose U.S.P. No. 80 powder | 130 |
| Starch (as 12½% paste) | 6 |
| Add: | |
| Cornstarch | 3 |
| Magnesium stearate | 1 |
| | 190 |

The [3-chloro-4-(2-nitro-1-propenyl) phenoxy] acetic acid and the lactose are mixed thoroughly and then granulated with the starch paste. While moist, the granulated material is passed through a No. 14 screen and then dried at 45° C. in an oven. After thorough drying, the material is passed several times through a No. 14 screen and the corn starch is passed through a No. 90 bolting cloth onto the granulation and blended, whereafter the magnesium stearate is passed through a No. 60 bolting cloth onto the granulation and thoroughly blended therewith. The material then is compressed into tablets, each weighing 190 mg. and containing 50 mg. of active ingredient per tablet.

Compressed tablets similar to those described in Example 18 can be prepared by substituting another product of this invention for the [3-chloro-4-(2-nitro-1-propenyl))phenoxy]-acetic acid recited therein, as for example, by substituting 50 mg. of [3-chloro-4-(2-nitro-1-butenyl)phenoxy]acetic acid or 50 mg. of [2-chloro-4-(2-nitro-1-butenyl)phenoxy]acetic acid.

In comparisons with other, structurally related compounds, the instant products (I) exhibit a marked increase in the excretion of sodium, potassium and chloride ions into the urine and, also, a marked increase in the excretion of fluids. The method employed in determining the degree of diuretic activity of the compounds tested consists of the following standard technique:

Trained female mongrel dogs in the postabsorptive state are given 500 ml. of water orally and 3.0 gm. of creatinine subcutaneously. An infusion of isotonic phosphate buffer containing mannitol is given at 3.0 ml./min. and, after 20 minutes, the urinary bladder is emptied by catheter and replicate 10-minute urine collections are made, with venous blood samples being drawn at the midpoint of each period. Following this control phase, the substance to be tested is injected intravenously in a priming dose and additional material is incorporated into the infusion at the rates indicated. Following a 20-minute equilibration period, replicate 10-minute collections of urine and blood are made. The increase in sodium excretion caused by each compound is given in the following table. The following Table II illustrates the increase in sodium excretion in microequivalents per minute from dogs at the stated dosage levels.

The table sets forth the results obtained through the foregoing method. In the table, the first and second columns indicate the product tested and the dose of product administered. A ¼ dose indicates that the dogs tested were given the product via priming dose of 6.25 mg./kg. followed by an infusion dose of 7.5 mg./kg./hr.; and a ¹⁄₁₀ dose indicates that the dogs tested were given the product via a priming dose of 2.5 mg./kg. followed by an infusion dose of 3.0 mg./kg./hr. The abbreviations $$T \frac{C}{D} \frac{\mu eg.}{min.}$$

which appear in the columns headed Na+ and K+ in Table II, indicate the ratio of increase, or decrease, in excretion of sodium and potassium ions in dog urine by the drug (D) tested, compared with the corresponding value for the control compound (C). The values are expressed in microequivalents per minute.

The abbreviation $$T \frac{C}{D}$$

which appears under the heading "Vol." in Table II has the same significance as above for expressing ion excretion except that the valves relate to the increase ( or decrease) of urine excreted from the subject in milliliters per minute (i.e., ml./min.).

The last column in Table II indicates the order of activity of the compounds tested, based upon the concentration of the sodium and potassium ions in the urine and the excretion of fluid from the subject.

From the results in Table II it will be seen that, in terms of the excretion of sodium and potassium ions, the products of the invention are about five times more effective than the closest prior art compound:

TABLE II

| Name | I.V. Dose | Na+ $T\frac{C\ \mu eq.}{D\ min.}$ | Percent Reab. | K+ $T\frac{C\ \mu eq.}{D\ min.}$ | Cl- $T\frac{C\ \mu eq.}{D\ min.}$ | Vol. $T\frac{C}{D}$ ml. | |
|---|---|---|---|---|---|---|---|
| [3-chloro-4-(2-nitro-1-propenylphenoxy] acetic acid | $\frac{1}{10}$ | $\frac{31}{1616}$ | $\frac{99.7}{83.1}$ | $\frac{42}{122}$ | $\frac{5}{2024}$ | $\frac{2}{15}$ | Very active. |
| [3-chloro-4-(2-nitro-1-butenyl) phenoxy] acetic acid | $\frac{1}{10}$ | $\frac{62}{1264}$ | $\frac{99.5}{86.0}$ | $\frac{61}{147}$ | $\frac{27}{1348}$ | $\frac{1}{11}$ | Do. |
| [2-chloro-4-(2-nitro-1-butenyl) phenoxy] acetic acid | $\frac{1}{10}$ | $\frac{45}{1768}$ | $\frac{99.6}{82.5}$ | $\frac{41}{207}$ | $\frac{8}{1835}$ | $\frac{1}{15}$ | Do. |
| [4-(2-nitro-1-propenyl) phenoxy] acetic acid* | $\frac{1}{10}$ | $\frac{15}{276}$ | $\frac{99.8}{96.5}$ | $\frac{55}{52}$ | $\frac{10}{334}$ | $\frac{5.1}{4.0}$ | Slightly active. |
| Do | $\frac{1}{4}$ | $\frac{8}{234}$ | $\frac{99.9}{96.0}$ | $\frac{17}{57}$ | $\frac{10}{352}$ | $\frac{0.9}{5.7}$ | Do. |
| [4-(2-nitrovinyl)phenoxy] acetic acid* | $\frac{1}{10}$ | $\frac{6}{5}$ | ---- | $\frac{32}{20}$ | $\frac{7}{5}$ | $\frac{1.9}{1.2}$ | Inactive. |
| Do | $\frac{1}{4}$ | $\frac{14}{15}$ | ---- | $\frac{46}{32}$ | $\frac{24}{8}$ | $\frac{6.5}{1.1}$ | Do. |

*Known compounds.

It will be apparent from the foregoing description that the [4-(2-nitro-1-alkenyl)aryloxy]alkanoic acid products (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A member selected from the group consisting of a compound having the formula:

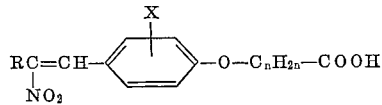

wherein R is lower alkyl; X is a member selected from the group consisting of halogen, lower alkenyl, mononuclear aryloxy, mononuclear aralkoxy and hydroxy lower alkyl and $n$ is an integer having a value of one to three; and the nontoxic, pharmacologically acceptable acid addition salts, lower alkyl esters, di-lower alkylaminoalkyl esters and amide, monoalkylamide, dialkylamide, pyrrolidide, piperidide and morpholide derivatives thereof.

2. A compound having the formula:

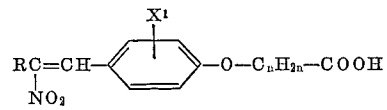

wherein R is lower alkyl; X¹ is a member selected from the group consisting of lower alkenyl, mononuclear aryloxy, mononuclear aralkoxy and hydroxy lower alkyl and $n$ is an integer having a value of one to three.

3. A compound having the formula:

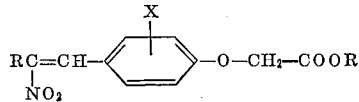

wherein R is lower alkyl and X¹ is halogen.

4. [3-chloro - 4-(2-nitro - 1-propenyl)phenoxy]acetic acid.
5. [3-chloro-4-(2-nitro-1-butenyl)phenoxy]acetic acid.
6. [2-chloro-4-(2-nitro-1-butenyl)phenoxy]acetic acid.

References Cited

Advanced Organic Chemistry, by E. Royals. (1956) pp. 785 and 786 relied on.

LORRAINE A. WEINBERGER, *Primary Examiner.*

L. ARNOLD THAXTON, *Assistant Examiner.*

U.S. Cl. X.R.

260—247.7, 294, 326.5, 472, 501.1, 294.7, 520, 521, 559; 424—309, 317, 324